United States Patent [19]

Mounts et al.

[11] 3,984,626
[45] Oct. 5, 1976

[54] PICTURE SIGNAL CODER

[75] Inventors: Frank William Mounts, Colts Neck; Arun Narayan Netravali; Birendra Prasada, both of Matawan, all of N.J.

[73] Assignee: Bell Telephone Laboratories, Incorporated, Murray Hill, N.J.

[22] Filed: Aug. 1, 1975

[21] Appl. No.: 601,087

[52] U.S. Cl. ............................. 178/6; 178/DIG. 3; 179/15 BC
[51] Int. Cl.² ........................................ H04M 7/12
[58] Field of Search ........................ 178/6, DIG. 3; 179/15 BC

[56] References Cited
UNITED STATES PATENTS 2,724,740   11/1955   Cutler .................................. 325/38

OTHER PUBLICATIONS

M. Chow, "Variable–Length Redundancy Removal Coder for Differentially Coded Video Telephone Signals," *IEEE Tran. Comm. Tech.*, vol. 19, No. 6, 12–71.
W. K. Pratt et al, "Application of Fourier–Hadamard Transformation to Bandwidth Compression," *Picture Bandwidth Compression,* edited by T. S. Huang and O. J. Tretiak (New York: Gordon and Breach, Science Publishers, 1972), pp. 515-554.

*Primary Examiner*—Robert L. Griffin
*Assistant Examiner*—Edward L. Coles
*Attorney, Agent, or Firm*—Richard J. Roddy

[57] ABSTRACT

In PCM and DPCM systems, a Hadamard orthogonal transformation of picture element signals is known to offer a means for reducing the bit rate for transmission of the signals. The first Hadamard coefficient, called $H_1$, equals the sum of the picture element signals. Accordingly, still further reduction in the transmission bit rate can be achieved by efficiently coding $H_1$. The disclosed coder includes a control signal generator for providing a control signal corresponding to a predetermined function of the quantized Hadamard coefficient signals. Several illustrative arrangements are disclosed. In three arrangements, the respective control signals are employed to adaptively select one of a plurality of quantizers, the selected quantizer for coding $H_1$. In a fourth arrangement, the control signal is employed to predict $H_1$, the predictor control signal being thereafter used for coding $H_1$.

20 Claims, 7 Drawing Figures

| RELATION OF MAXIMUM MAGNITUDE TO THRESHOLD | OUTPUT OF THRESHOLD CIRCUIT | | | CONTROL SIGNAL ON LEAD 230 | SELECTED QUANTIZER |
|---|---|---|---|---|---|
| | 216-1 | 216-2 | 216-3 | | |
| $\text{MAX}(|H_{2Q}|,|H_{4Q}|) < T_1$ | 0 | 0 | 0 | 00 | 221-1 |
| $T_1 \leq \text{MAX}(|H_{2Q}|,|H_{4Q}|) < T_2$ | 1 | 0 | 0 | 01 | 221-2 |
| $T_2 \leq \text{MAX}(|H_{2Q}|,|H_{4Q}|) < T_3$ | 1 | 1 | 0 | 10 | 221-3 |
| $T_3 \leq \text{MAX}(|H_{2Q}|,|H_{4Q}|)$ | 1 | 1 | 1 | 11 | 221-4 |

PICTURE SIGNAL CODER

BACKGROUND OF THE INVENTION

1. Field of the Invention

This invention relates to digital communication systems and, more particularly, to a coder arrangement which may be employed in such systems for coding orthogonally transformed image signals.

2. Description of the Prior Art

Various digital data systems are known for communicating image signals such as are associated with a television picture, some of which are concerned with reducing the signal transmission bit rate. Exemplary of such bit rate reduction systems are those of the type known as differential pulse code modulation (DPCM) systems. Typically, a DPCM system employs a predictive coder using a feedback circuit to provide a comparison signal so that only the difference between a previously coded image signal and an upcoming image signal need be currently coded and transmitted.

Efficient picture source coding can also be accomplished by first determining the structure of the pictorial data and then developing a coder that is efficient for data having that particular structure. Since pictorial data are not usually homogeneous, different regions of a picture often contain different structures. Accordingly, it is common to partition a picture image into subpictures, each having a plurality of picture elements, also called pels in the art, and to design a coder for the data structure of a subpicture.

In addition, it is known that the pel signals may be transformed by orthogonal transform logic to provide a plurality of transform coefficient signals. Related thereto is a Hadamard orthogonal transformation, which is known to offer still another means for reducing the bit rate of an image signal. Our invention broadly relates to the aforementioned prior art bit rate reduction arrangements, but more specifically improves upon orthogonal transform arrangements.

A typical Hadamard orthogonal transformation can be illustrated using a four-by-four Hadamard matrix. Using common matrix notation, the illustrative Hadamard matrix, arranged in order of increasing sequency, is:

$$H = \begin{bmatrix} 1 & 1 & 1 & 1 \\ 1 & 1 & -1 & -1 \\ 1 & -1 & -1 & 1 \\ 1 & -1 & 1 & -1 \end{bmatrix}$$

Sequency is a common term of art relating to the number of algebraic sign changes in a row of the Hadamard matrix. Premultiplying the Hadamard matrix by a row matrix of, for example, pel signals A, B, C and D results in a row matrix of Hadamard transform coefficient signals $H_1$, $H_2$, $H_3$ and $H_4$:

$H_1 = A+B+C+D$
$H_2 = A+B-C-D$
$H_3 = A-B-C+D$
$H_4 = A-B+C-D$

That being the case, the first Hadamard coefficient signal of a subpicture image signal, $H_1$, is seen to be equal to the sum of the four pel signals. Consequently, $H_1$ proportionally contributes the largest fraction of bits necessary to define the subpicture. Thus a significant reduction in the transmission bit rate could be achieved by efficiently coding $H_1$ as, for example, by using fewer bits. However, known coding arrangements typically code all coefficient signals including $H_1$ using standard pulse code modulation (PCM) or DPCM techniques.

Accordingly, it is a broad object of our invention to provide an arrangement for efficiently coding an orthogonally transformed image signal.

SUMMARY OF THE INVENTION

According to our invention this and other objects are achieved in an improved coder arrangement having apparatus for providing a control signal in response to a particular function of a plurality of orthogonally transformed image signals. The control signal is then employed to quantize a signal corresponding to a predetermined orthogonally transformed image signal. In three illustrative coder arrangements, the respective control signals are employed to adaptively select one of a plurality of quantizers, the selected quantizer coding the predetermined transformed signal. In a fourth illustrative arrangement, the control signal is employed as a predictor for the predetermined transformed signal, the predictor being thereafter used to code the signal.

BRIEF DESCRIPTION OF THE DRAWING

Our invention should become more apparent from the following detailed description when taken in conjunction with the drawing, in which:

FIG. 7 is a table exemplifying signals and quantizers selected in response thereto for a coder of the type illustrated in FIG. 2.

DETAILED DESCRIPTION

Figure 1:
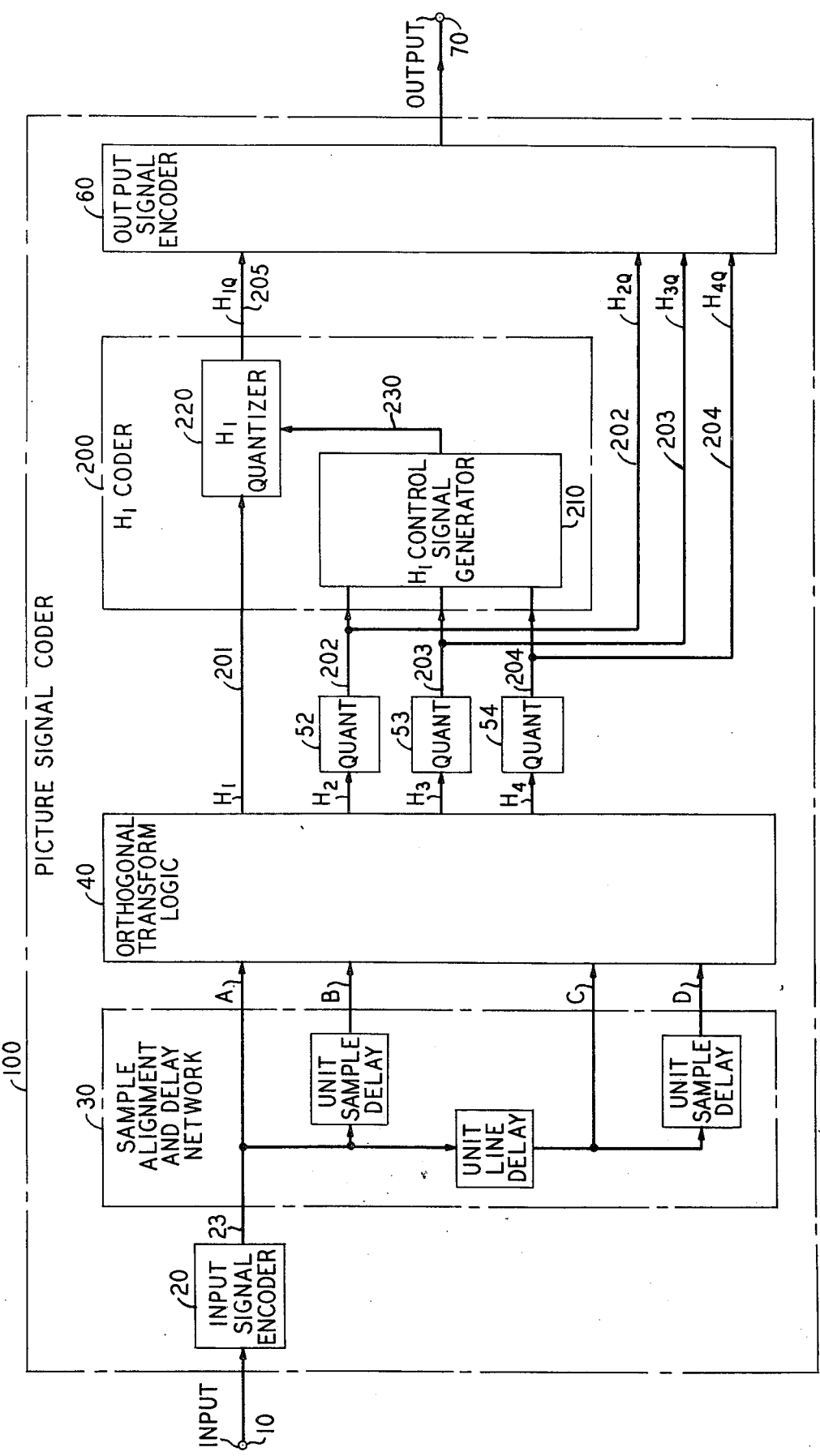
FIG. 1 shows an illustrative embodiment of a picture signal coder arrangement in accordance with the principles of our invention.

Broadly, as shown in FIG. 1, an image signal to be coded is provided to input terminal 10 of picture signal coder 100. The image signal is extended through standard input signal encoder 20 over lead 23 to sample alignment and delay network 30 to provide a plurality of subpicture pel signals to orthogonal transform logic 40, thereby obtaining a plurality of orthogonally transformed coefficient signals. Illustratively, orthogonal transform logic 40 is assumed to include conventional Hadamard orthogonal transform logic for providing Hadamard coefficient signals $H_1$, $H_2$, $H_3$ and $H_4$ in response to picture element signals A, B, C and D. Each coefficient signal other than $H_1$ is extended from transform logic 40 through a corresponding quantizer. Here signals $H_2$, $H_3$ and $H_4$ are extended through corresponding quantizers 52, 53 and 54 to provide quantized Hadamard coefficient signals $H_{2Q}$, $H_{3Q}$ and $H_{4Q}$ on leads 202, 203 and 204, respectively. Leads 202, 203 and 204 are connected to standard output signal encoder 60. Thus far the description of FIG. 1 relates to an arrangement well known in the art.

However, according to our invention, leads 202, 203 and 204 are also connected to $H_1$ control signal generator 210 of $H_1$ coder 200. Control signal generator 210 extends a control signal over lead 230 to $H_1$ quantizer 220. The control signal corresponds to a predetermined function of the coefficient signals. Responsive to the control signal, the first Hadamard coefficient signal, extended from transform logic 40 over lead 201 to $H_1$ quantizer 220, is efficiently coded and extended as quantized $H_1$ coefficient, called signal $H_{1Q}$, over lead 205 to encoder 60. An output of encoder 60 is provided to output terminal 70. Thereby, in accordance with a broad aspect of our invention, a control signal is provided in response to a predetermined function of a plurality of orthogonally transformed image signals for one of a plurality of quantizers to efficiently code a predetermined one of the orthogonally transformed signals.

Further, by transmitting coded coefficient signals other than $H_1$ prior to transmitting the coded representation of $H_1$, a decoder at a receiver is readily realizable to obtain the proper decoding of $H_1$ without requiring that still further information be transmitted. For ease and clarity of description, our disclosure will be made in terms of a coder. It is understood that a decoder is readily realizable by one skilled in the art applying the principles of our invention as described relative to the coder.

Specifically, yet illustratively, $H_1$ is efficiently coded by coder 200 so as to reduce the number of bits required to code $H_1$ while at the same time obtaining a predetermined source attribute, for example, obtaining satisfactory picture quality. Typically, picture quality requires a subjective evaluation of the perceptual attributes of the picture image. Illustratively, one way in which the aforementioned structural partitioning into different regions of a picture may be made is according to picture busyness. Picture busyness is known to relate to the perception of substantial image changes between or within subpictures as well as to the perception of quantization errors, the latter controlling picture quality. The predetermined function of the plurality of orthogonally transformed signals may advantageously be taken, therefore, as a measure of picture busyness. Thus efficient coding of $H_1$ may be realized by forcing the coding of $H_1$ to depend upon picture busyness. For example, $H_2$ and $H_4$ will typically have large magnitudes in a busy region of a picture. Accordingly, a less accurate specification of the magnitude of $H_1$ will there be subjectively acceptable. Thus a quantizer with fewer quantization levels may be adaptively selected to code $H_1$ in a busy region. Conversely, in a nonbusy region of the picture, $H_1$ needs to be specified more accurately. Thus a quantizer with more quantization levels may be selected to code $H_1$ in a nonbusy region.

Various coder arrangements employing the broad principles of our invention are possible. For example, shown respectively in FIGS. 2–5 are four illustrative embodiments of $H_1$ coder 200.

Figure 2:
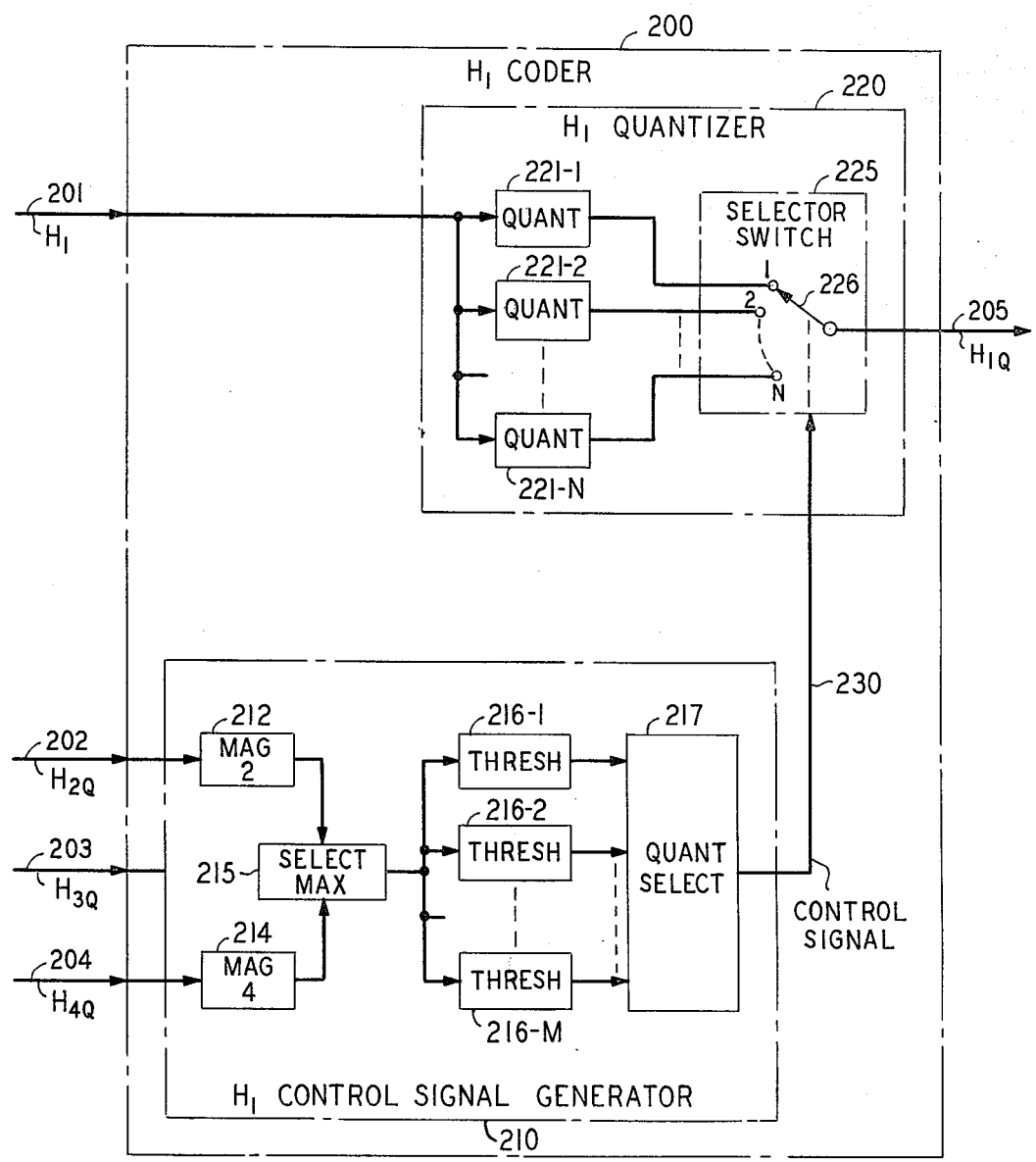
FIGS. 2–5 illustrate four alternative arrangements of a picture signal coder, each of which may be employed in the coder of FIG. 1.

The $H_1$ coder illustrated in FIG. 2 is operative to quantize $H_1$ in a PCM system by adaptively selecting one of a plurality of quantizers in response to the control signal. Lead 201, to which the $H_1$ signal is provided by transform logic 40, is jointly connected to an input of each of quantizers 221-1 through 221-N of $H_1$ quantizer 220. Basically, the adaption among the quantizers is done in a subjective and statistically advantageous manner under control of a predetermined function of particular orthogonally transformed coefficient signals, illustratively based upon picture busyness as discussed above. The illustrative predetermined function is the maximum magnitude of selected orthogonally transformed quantized coefficient signals $H_{2Q}$ and $H_{4Q}$.

In FIG. 2, the quantized $H_2$ and $H_4$ coefficient signals, appearing respectively on leads 202 and 204, are processed by magnitude determining circuits 212 and 214 and maximum selecting circuit 215. The maximum magnitude of the two coefficient signals is fed jointly to an input of each of threshold circuits 216-1 through 216-M. Each threshold circuit includes conventional apparatus for comparing an input signal magnitude with a predetermined threshold. The predetermined threshold is a design parameter taken to subjectively and statistically reduce the visibility of quantization noise and, hence, help obtain acceptable picture quality. This reduction in quantization noise will be described in greater detail relative to FIG. 4. An output of each threshold circuit is, illustratively, a logic one signal if the input signal is greater than or equal to the threshold; and, conversely, a logic zero signal if the input signal is less than the threshold. In response to the outputs of the pluraltiy of threshold circuits, quantizer selector 217 connects the control signal over lead 230 for operating selector switch 225 of $H_1$ quantizer 220. Then operational switch 225 selects one of quantizers 221-1 through 221-N. By way of illustrating the aforementioned operation, assume three threshold circuits, i.e., $M = 3$, with respective thresholds $T_1$, $T_2$ and $T_3$, which are in the algebraic relation $T_1 < T_2 < T_3$. Further, assume $H_1$ quantizer 220 includes four quantizers, i.e., $N = 4$. Also, let the symbol max ($|H_{2Q}|$, $|H_{4Q}|$) represents the maximum magnitude of the selected quantized coefficient signal as provided by maximum selecting circuit 215. The maximum magnitude is thereafter provided jointly to an input of threshold circuits 216-1, 216-2 and 216-3. In response thereto, the table illustrated in FIG. 7 shows the output of the respective threshold circuits for ranges of each comparative relation of maximum magnitude to threshold, the control signal provided to lead 230 by selector 217, and the subsequently selected quantizer. It is clear that quantizers 221-1 through 221-4 need respectively fewer and fewer quantization levels and, hence, provide an arrangement for reducing the transmission bit rate. Thereby, in accord with the principles of our invention, one of the plurality of quantizers 221-1 through 221-N is adaptively selected for efficiently coding the $H_1$ signal appearing on lead 201. Thereafter, the quantized $H_1$ signal, called $H_{1Q}$, is extended through wiper 226 of selector switch 225 over lead 205 to encoder 60.

Figure 3:
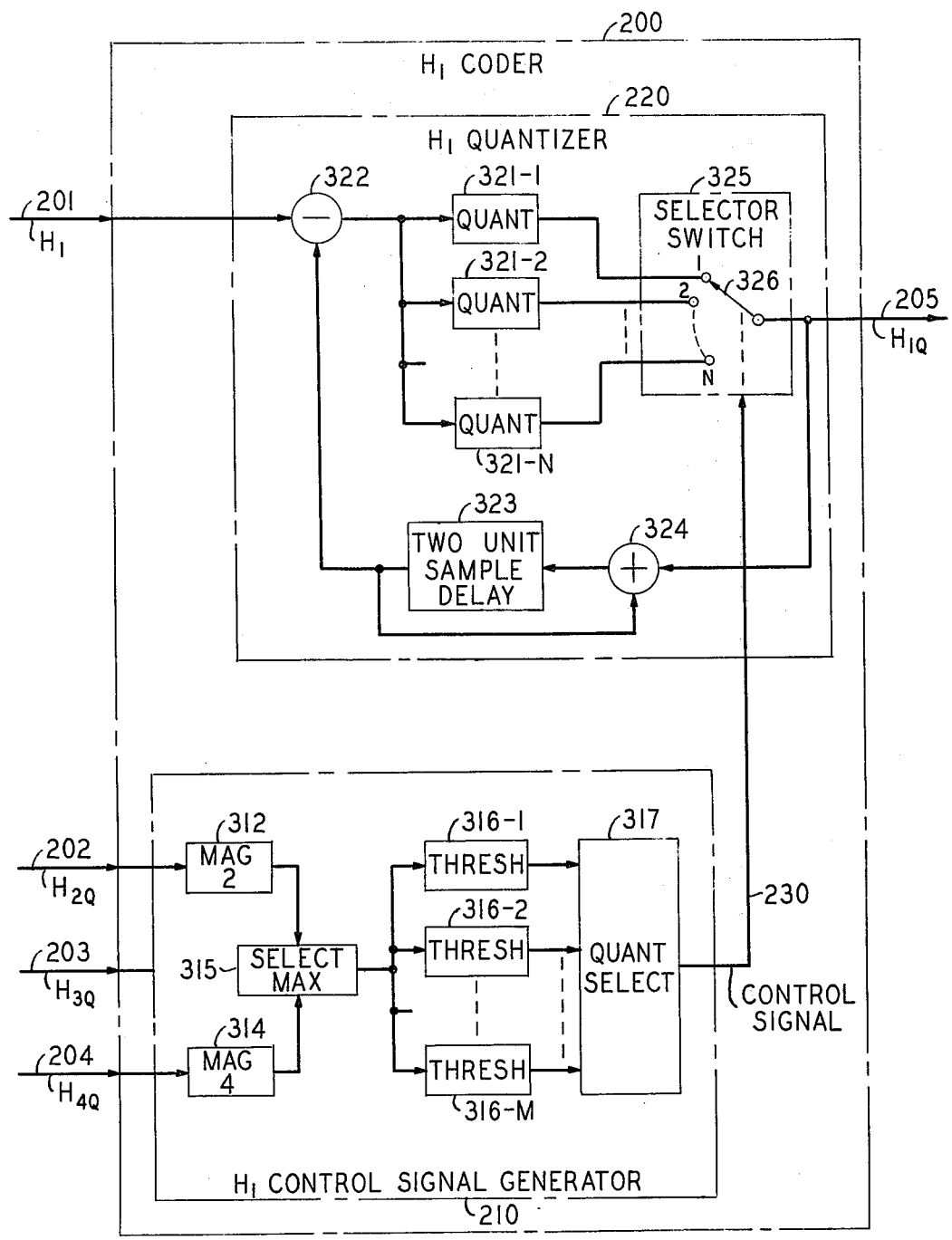

The $H_1$ coder illustrated in FIG. 3 is operative to quantize $H_1$ in a DPCM system by adaptively selecting one of a plurality of quantizers in response to the control signal. Basically, the DPCM coder of FIG. 3 includes the $H_1$ coder of FIG. 2 and adds thereto DPCM subtractor 322, adder 324, and two unit sample delay 323. An output of subtractor 322 is a comparison signal to be quantized by one of quantizers 321-1 through 321-N. Specifically, the elements of $H_1$ control signal generator 210 in FIG. 3 are structurally and functionally similar to the corresponding elements of generator 210 in the aforedescribed FIG. 2. Thus the control signal provided by generator 210 in FIG. 3 is also related to the magnitude of the $H_2$ and $H_4$ signals and, hence, is also a measure of picture busyness. Too, but for the design of a lower maximum magnitude comparison signal at the output of subtractor 322, quantizers 321-1 through 321-N together with selector switch 325 of $H_1$ quantizer 220 in FIG. 3 are structurally and functionally similar to the quantizers and selector switch employed in the coder of FIG. 2. However, in contradistinction to the coder of FIG. 2, the structure illustrated in FIG. 3 adaptively selects one of the plurality of quantizers for use in a DPCM system. That is, the coder of FIG. 3 advantageously combines the bit rate reduction advantage of standard DPCM with the bit rate reduction provided in accord with the principles of our invention for efficiently coding $H_1$ by providing a control signal in response to a predetermined function of a plurality of orthogonally transformed image signals so that one of the plurality of quantizers may thereafter efficiently code a predetermined one of the orthogonally transformed signals.

Figure 4:
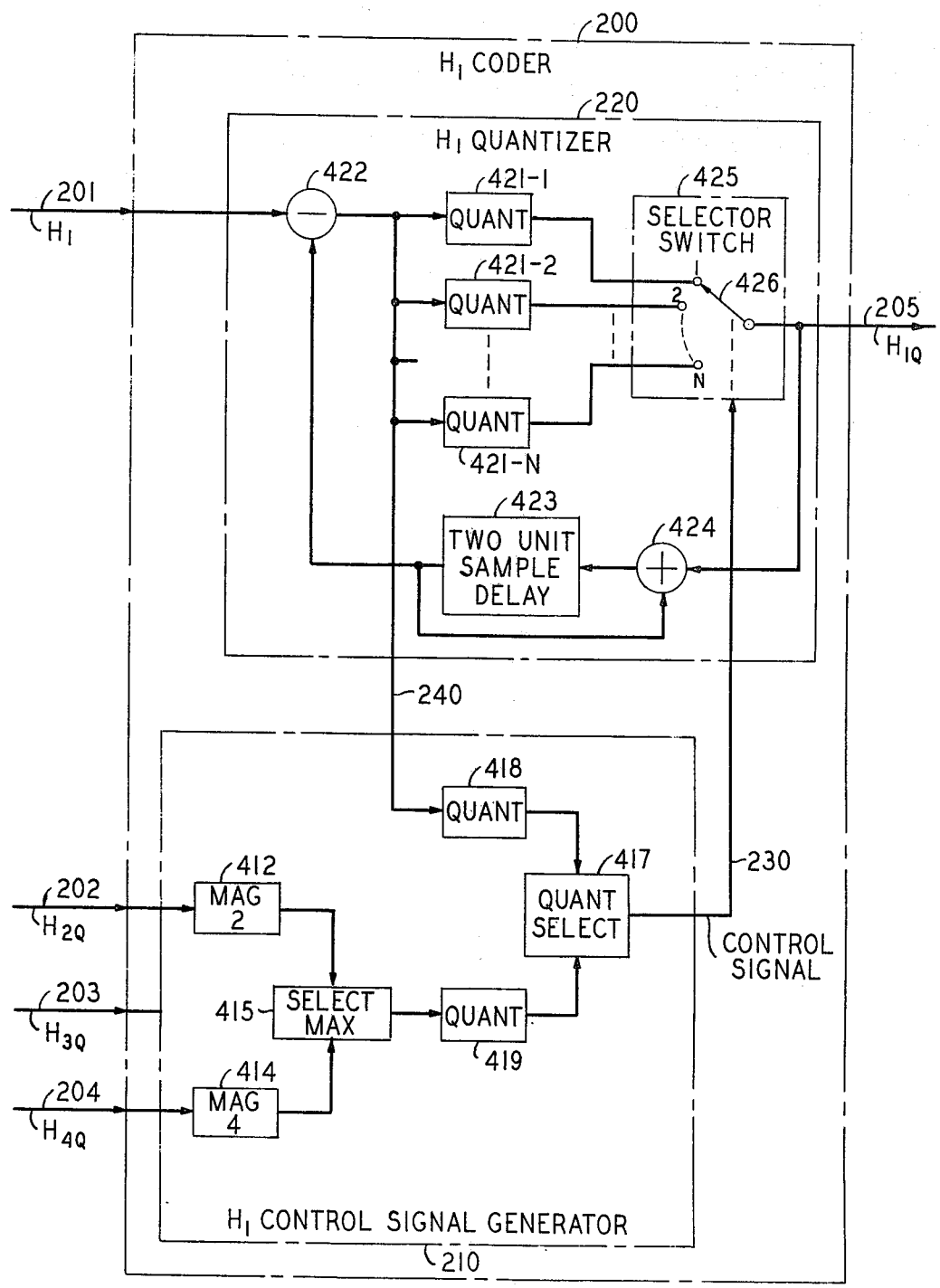

The third illustrative $H_1$ coder, shown in FIG. 4, is also operative to quantize $H_1$ in a DPCM system by selecting one of a plurality of quantizers in response to the control signal. However, using the DPCM coder of FIG. 4, the efficient coding of $H_1$ is achieved not only to obtain a perceptually acceptable picture quality but also to decrease the entropy of the coded signal. The DPCM coder of FIG. 4, while substantially similar to the DPCM coder of FIG. 3, differs in the control signal arrangement employed in order to achieve a decrease in the entropy of the quantized $H_1$ signal. Specifically, the elements of $H_1$ quantizer 220 in FIG. 4 are structurally and functionally similar to the corresponding elements of quantizer 220 in the aforedescribed FIG. 3. Also, magnitude determining circuits 412 and 414 together with maximum selecting circuit 415 in FIG. 4 are structurally and functionally similar to the determining and selecting circuits in FIG. 3. Thus an input to quantizer 419 is the maximum magnitude of the quantizer second and fourth coefficient signals, a measure of picture busyness. The maximum magnitude is quantized according to a transfer characteristic based upon the visibility of noise as a function of the maximum magnitude signal.

However, in contradistinction to the coder of FIG. 3, control signal generator 210 of FIG. 4 provides a control signal for adaptively selecting one of quantizers 421-1 to 421-N in such a way as to also decrease the entropy of the coded signal. A typical quantizer will have an integer number of quantization levels. The occurrence of a quantization level is readily measurable by a known probability function. Increasing the occupancy of the lower quantization levels will typically reduce the entropy of the quantized output signal. The $H_1$ coder of FIG. 4 attains this result by utilizing the well-known attribute that the human eye is tolerant of relatively large amounts of noise in the busy region of a picture. In so doing, quantizer 419 in control signal generator 210 provides the measure of busy region quantization noise.

More particularly, the $H_1$ coefficient signal provided on lead 201 is extended through DPCM subtractor 422, thence over lead 240 jointly to respective inputs of quantizers 421-1 through 421-N in quantizer 220 as well as to an input of quantizer 418 in control signal generator 210. An output of quantizer 418 is extended to a first input of quantizer selector 417. A second input to selector 417 is provided by an output of quantizer 419. Selector 417, in response to the first and second inputs, provides an output control signal to lead 230 for selecting among quantizers 421-1 and 421-N. Thereby, coder 200 obtains a decrease in entropy resulting in the efficient coding of the quantized $H_1$ signal without a commensurate decrease in picture quality by adapting among the plurality of quantizers in response to the control signal.

To illustrate the operation of coder 200 in FIG. 4, assume $H_1$ quantizer 220 includes two quantizers, i.e., $N = 2$. For economy, the two quantizers may share one classifier circuit, the classifier being the section of a quantizer containing decision level circuitry for dividing an input signal into a number of intervals. Further, assume the transfer characteristic of standard quantizers 421-1 and 421-2 are related in such a way that responsive to each input signal the output of quantizer 421-1 is a next higher quantum level as compared to the output of quantizer 421-2, except the lowest level of the two quantizers, which is the same for both. With wiper 426 of selector 425 arranged to extend the output of quantizer 421-1 to lead 205, the output of quantizer 418 corresponds to the quantization noise introduced by quantizer 421-2. Illustratively, let quantizer selector 417 be a straightforward comparator. The quantized error output of quantizer 418 is compared by selector 417 with the quantized measure of picture busyness provided by quantizer 419, the latter being a dynamic threshold. If the error output does not exceed the dynamic threshold, an output control signal is provided by selector 417 for selecting quantizer 421-2 and thereby selecting the next lower quantization level. As aforementioned, using the next lower quantization level decreases the entropy of the encoded signal. Conversely, if the error output exceeds the threshold, quantizer 421-1 is selected for quantizing $H_1$. Thereby, in accord with the principles of our invention, responsive to a control signal, one of a plurality of quantizers is adaptively employed to efficiently code a predetermined one of the orthogonal coefficient signals.

Figure 5:
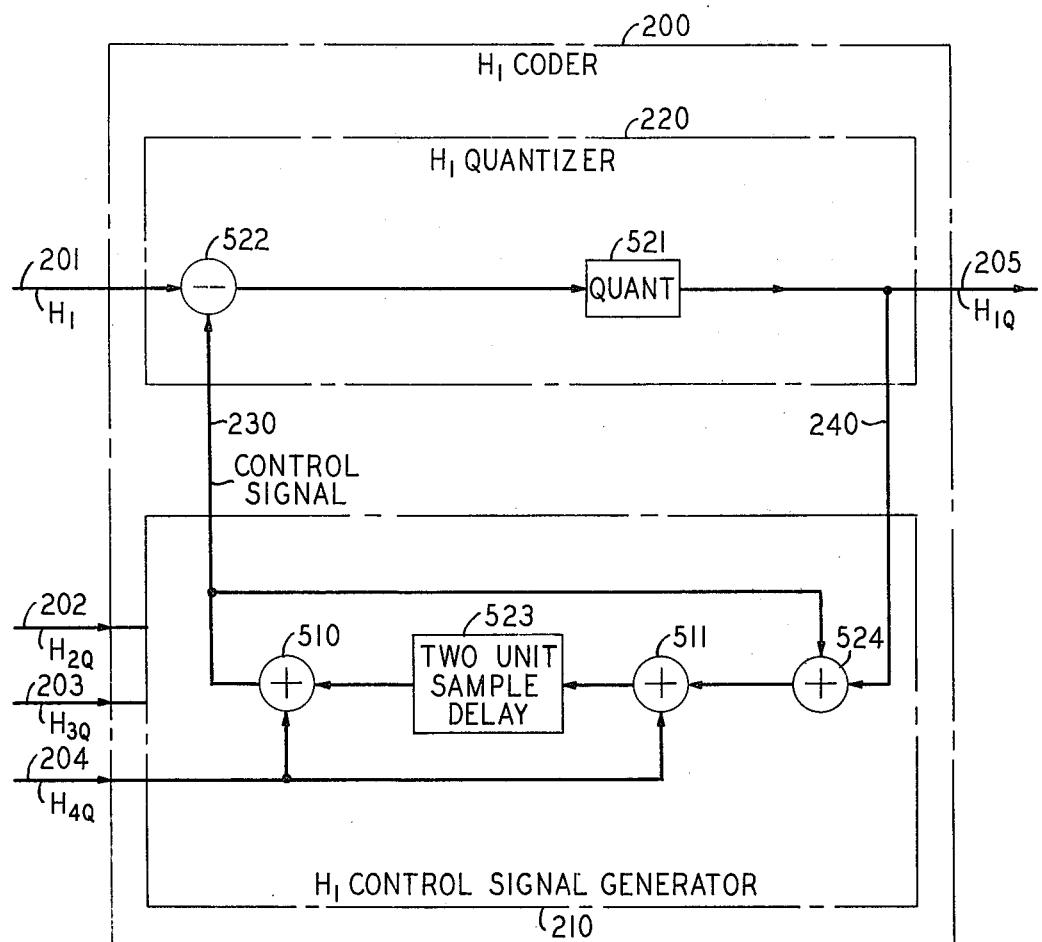
Figure 6:
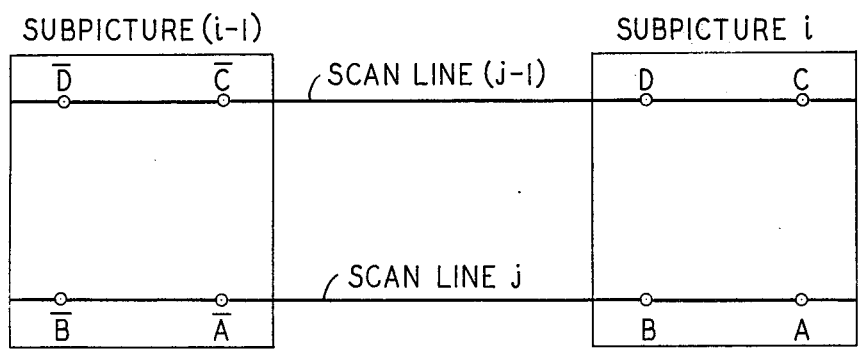
FIG. 6 illustrates two consecutive subpictures of a picture image, which are used herein as an aid in describing the principles of our invention.

The fourth $H_1$ coder, illustrated in FIG. 5, is operative to quantize $H_1$ in a DPCM system by advantageously predicting $H_1$ based upon orthogonal coefficient signals other than the $H_1$ signal then being coded. The resultant prediction error relates to picture element signal differences which are spatially close. Thereby, in efficiently coding $H_1$, the coder advantageously obtains a better spatial masking of quantization noise. Specifically, and as illustrated in FIG. 6, subpicture $(i-1)$ and subpicture $i$ are two horizontally adjacent subpictures. Subpicture $(i-1)$ includes picture elements $\bar{A}, \bar{B}, \bar{C}$ and $\bar{D}$, which give rise to coefficient signals $\bar{H}_1, \bar{H}_2, \bar{H}_3$ and $\bar{H}_4$, paralleling the aforedescribed corresponding pel and coefficient signals of subpicture $i$. As aforementioned, a typical DPCM system employs a predictive coder to provide a comparison signal so that only the difference between a previously coded image signal, for example $\bar{H}_1$, and an upcoming image signal, for example $H_1$, need be currently coded and transmitted. Unfortunately, the prior art comparison signal, called $\Delta H_1$, so provided is equal to an algebraic sum of spatially large pel signal differences. Specifically, using well-known algebraic symbology, the prior art comparison signal $\Delta H_1$ is:

$$\Delta H_1 = H_1 - \bar{H}_1$$

$$\Delta H_1 = (D-\bar{C})+(B-\bar{A})+(C-\bar{D})+(A-\bar{B}).$$

An improved predictor resulting in substantial reduction in the prediction error and illustrated in the coder embodiment of FIG. 5 employs coefficient signals other than the $H_1$ signal currently being coded. Illustratively, one such improved predictor control signal for $H_1$ is equal to the sum of (1) the fourth coefficient signal of subpicture $i$ and (2) the first and fourth coefficient signals of subpicture ($i-1$), i.e., $H_4 + \overline{H}_1 + \overline{H}_4$, gives an improved comparison signal $\Delta \hat{H}_1$:

$$\Delta \hat{H}_1 = H_1 - (H_4 + \overline{H}_1 + \overline{H}_4)$$

$$\Delta \hat{H}_1 = (D-\overline{C})+(B-\overline{A})+(D-\overline{C})+(B-\overline{A}).$$

Accordingly, as is clear by straightforward analysis of the illustration of FIG. 6, the spatial separation corresponding to the last two terms of the improved comparison signal, i.e., $(D-\overline{C})+(B-\overline{A})$, is less than the spatial separation corresponding to the last two terms of the prior art comparison signal, i.e., $(C-\overline{D})+(A-\overline{B})$. Hence, the improved predictor control signal provides a smaller prediction error. Stemming from a small prediction error, the coder obtains an improved spatial masking of quantization noise. Further, the magnitude of the comparison signal thereafter quantized by quantizer 521 is less than the magnitude of the prior art comparison signal, thereby obtaining a reduction in the transmission bit rate by more efficient coding of $H_1$. The coder of FIG. 5 advantageously appends adders 510 and 511 to an otherwise standard DPCM arrangement. Thereby, the coder of FIG. 5 advantageously combines the bit rate reduction advantage of standard DPCM with the bit rate reduction provided in accord with the principles of our invention for efficiently coding $H_1$ by providing a control signal in response to a predetermined function of a plurality of orthogonally transformed image signals. Responsive to the control signal, one of a plurality of quantizers in coder 100 is employed to thereafter quantize a signal corresponding to a predetermined one of the orthogonally transformed signals.

Although the invention has been described and illustrated in detail, it is to be understood that the same is by way of illustration and example only, and is not to be taken by way of limitation. For example, it is clear that one skilled in the art by applying the principles of our invention can combine the predictor control signal arrangement of the coder of FIG. 5 with the coder in either FIG. 3 or FIG. 4. Thereby, the resultant arrangement includes a control signal for selecting one of a plurality of quantizers as well as an improved predictor control signal. It is also clear that the principles of our invention are not limited to efficient coding of the first coefficient signal, but rather extend broadly to any of the transform coefficient signals. Thus, the spirit and scope of our invention is limited only by the terms of the appended claims.

We claim:

1. In a communication system, a circuit for coding a plurality of orthogonally transformed image signals, said transformed signals corresponding to an image to be coded, said circuit including a first plurality of quantizers and characterized in that said circuit further comprises:
   means for providing a control signal to one of said first plurality of quantizers responsive to a predetermined function of said orthogonally transformed signals; and
   means in said one quantizer responsive to said control signal for adaptively quantizing a signal corresponding to a predetermined one of said orthogonally transformed signals.

2. The circuit according to claim 1 wherein said signal quantizing means comprises:
   a second plurality of quantizers; and
   means responsive to said control signal for adaptively selecting one of said second plurality of quantizers.

3. The circuit according to claim 1 wherein said signal quantizing means comprises:
   means for producing a comparison signal, said comparison signal being applied to a second plurality of quantizers; and
   means responsive to said control signal for adaptively selecting one of said second plurality of quantizers.

4. The circuit according to claim 1 wherein said signal quantizing means comprises:
   means responsive to said control signal for producing a comparison signal, said comparison signal being applied to at least one of said plurality of quantizers.

5. The circuit according to claim 1 wherein said control signal providing means comprises means for obtaining a predetermined attribute of said image.

6. The circuit according to claim 5 wherein said attribute obtaining means includes means for measuring picture busyness.

7. The circuit according to claim 5 wherein said attribute obtaining means comprises:
   means for providing a first signal responsive to all but said predetermined one of said transformed signals.

8. The circuit according to claim 7 wherein said control signal providing means further comprises:
   means responsive to said first provided signal for jointly comparing said first signal with a plurality of threshold signals.

9. The circuit according to claim 8 wherein said control signal providing means further comprises means responsive to said comparing means for providing said control signal.

10. The circuit according to claim 9 wherein said signal quantizing means further comprises:
    a second plurality of quantizers; and
    means responsive to said control signal for adaptively selecting one of said second plurality of quantizers.

11. The circuit according to claim 9 wherein said signal quantizing means further comprises:
    means for producing a comparison signal, said comparison signal being jointly applied to a second plurality of quantizers; and
    means responsive to said control signal for adaptively selecting one of said second plurality of quantizers.

12. The circuit according to claim 1 wherein said control signal providing means comprises means for decreasing the entropy of said predetermined transformed signal.

13. The circuit according to claim 12 wherein said control signal providing means further comprises means for obtaining a predetermined attribute of said image.

14. The circuit according to claim 13 wherein said attribute obtaining means includes means for measuring picture busyness.

15. The circuit according to claim 13 wherein said attribute obtaining means comprises:
    means for providing a first signal responsive to all but said predetermined one of said transformed signals.

16. The circuit according to claim 15 wherein said signal quantizing means further comprises:

means for producing a comparison signal, said comparison signal being applied to a second plurality of quantizers; and means responsive to said control signal for adaptively selecting one of said second plurality of quantizers.

17. The circuit according to claim 16 wherein said entropy decreasing means further comprises means responsive to said first provided signal for comparing said first signal with said comparison signal.

18. The circuit according to claim 17 wherein said entropy decreasing means further comprises means responsive to said comparing means for providing said control signal.

19. The circuit according to claim 1 wherein said control signal providing means comprises means for predicting said predetermined transformed signal, said predicting control signal being a predetermined function of all but said predetermined signal currently being coded.

20. The circuit according to claim 19 wherein said signal quantizing means comprises means for quantizing a comparison signal, said comparison signal corresponding to the difference between said predetermined transformed signal and said predicting control signal.

* * * * *